United States Patent [19]

Susini et al.

[11] Patent Number: 4,981,463
[45] Date of Patent: Jan. 1, 1991

[54] DEVICE FOR POSITIONING FITMENTS IN A PERFORATED FILM

[75] Inventors: Etienne Susini, Villecresnes, France; Pierre Soubrier, Brussels, Belgium

[73] Assignee: Baxter International Inc., Deerfield, Ill.

[21] Appl. No.: 363,321

[22] Filed: Jun. 8, 1989

Related U.S. Application Data

[63] Continuation of Ser. No. 155,926, filed as PCT FR87/00169 on May 20, 1987, published as WO87/07211 on Dec. 3, 1987, abandoned.

[30] Foreign Application Priority Data

May 21, 1986 [FR] France .................. 8607205

[51] Int. Cl.$^5$ .............. B65G 19/06; B65G 19/22; B31B 49/00
[52] U.S. Cl. .................. 493/380; 493/213; 493/390; 198/468.9; 198/468.1; 198/468.11; 198/734
[58] Field of Search .......... 493/29, 30, 212, 213, 493/345, 348, 351, 380, 384, 390, 210; 198/465.1, 728, 733, 803.14, 803.15, 468.9, 468.1, 468.11, 734, 859

[56] References Cited

U.S. PATENT DOCUMENTS

| | | |
|---|---|---|
| 622,064 | 3/1899 | Neacy .................. 198/728 |
| 1,336,304 | 4/1920 | Leumann . |
| 1,934,835 | 11/1933 | Weiss .................. 198/203 |
| 2,311,600 | 2/1943 | Shook .................. 154/9 |
| 2,529,777 | 11/1950 | McInnis .................. 198/135 |
| 3,069,303 | 12/1962 | Scholle . |
| 3,244,576 | 4/1966 | Swartz . |
| 3,355,340 | 11/1967 | Calvert . |
| 3,358,810 | 12/1967 | Zauner .................. 198/171 |
| 3,389,643 | 6/1968 | Lemcke et al. .................. 93/8 |
| 3,425,887 | 2/1969 | Bowen . |
| 3,434,908 | 3/1969 | MacDonald . |
| 3,594,149 | 7/1971 | Pickavance et al. .................. 198/733 |
| 3,783,080 | 1/1974 | Goglio . |
| 3,812,572 | 5/1974 | Weikert . |
| 3,821,046 | 6/1974 | Runge . |
| 3,894,381 | 7/1975 | Christine . |
| 3,948,711 | 4/1976 | Piatek .................. 156/215 |
| 4,027,577 | 6/1977 | Thompson . |
| 4,055,032 | 10/1977 | Hammond . |
| 4,120,134 | 10/1978 | Scholle . |
| 4,166,412 | 9/1979 | Versteege . |
| 4,246,062 | 1/1981 | Christine . |
| 4,394,936 | 7/1983 | Shavit . |
| 4,510,737 | 4/1985 | Ellert . |
| 4,533,425 | 8/1985 | Wehle . |
| 4,566,250 | 1/1986 | Matsumura . |
| 4,568,321 | 2/1986 | Gaubert . |
| 4,710,157 | 12/1987 | Posey .................. 493/213 |

FOREIGN PATENT DOCUMENTS

| | | |
|---|---|---|
| 0107474 | 5/1984 | European Pat. Off. . |
| 0107474 | 5/1984 | European Pat. Off. . |
| 540602 | 12/1931 | Fed. Rep. of Germany . |
| 1118233 | 6/1956 | France . |
| 1291649 | 3/1962 | France . |
| 2111021 | 6/1972 | France . |
| 2162773 | 7/1973 | France . |
| 2162773 | 7/1973 | France . |
| 66033 | 7/1950 | Netherlands . |
| 1322784 | 7/1973 | United Kingdom . |
| 2074934B | 5/1984 | United Kingdom . |

Primary Examiner—Frederick R. Schmidt
Assistant Examiner—Jack Lavinder
Attorney, Agent, or Firm—Paul E. Schaafsma; Paul C. Flattery; Bradford R. L. Price

[57] ABSTRACT

A device for positioning fitments in a perforated film. The device according to the invention includes a transporting member that brings the fitments into the vicinity of a perforated film, preferably below the latter, a member for positioning the fitments perpendicular to the perforations in the film, and an engaging member for pushing the ports through the perforations of the film so that at the exit of the device the film is equipped with fitments.

13 Claims, 4 Drawing Sheets

DEVICE FOR POSITIONING FITMENTS IN A PERFORATED FILM

This application is a continuation of application Ser. No. 07/155,926, filed as PCT FR87/00169 on May 20, 1987, published as WO87/07211 on Dec. 3, 1987 now abandoned.

BACKGROUND OF THE INVENTION

The present invention relates to a device for positioning fitments on a perforated film. The invention especially relates, although not exclusively so, to the making of perfusion pouches or bags.

There are known flexible perfusion bags or pouches equipped with a port or fitment that allows for the introduction of a treatment product into the liquid contained in the bag or pouch, or for the distribution of the liquid contained in the bag or pouch. Those bags or pouches are generally constructed from a film on which the port or fitment is sealed in a position facing openings perforated in the film. In presently existing devices, the ports or fitments are placed on the film in a position perpendicular to the perforations, so that their base rests on the film to which it is later heat sealed. After the port or fitment has been placed on the film, and prior to the sealing operation, the port or fitment is not held in place and it risks movement with respect to the perforations in the film. Additionally following the sealing operation, the film is shaped to form a bag with the port or fitment completely outside the bag or pouch, including its base, so that the port is entirely subjected to stresses exerted on it during different handlings.

SUMMARY OF THE INVENTION

One purpose of the present invention is to provide a device for positioning ports or fitments on a perforated film to prevents the above-mentioned drawbacks.

To achieve this provides, the present invention proposes a device for the positioning of ports or fitments on a perforated film, including transporting means to bring the ports or fitments close to the film, positioning means to place the ports or fitments perpendicular relative to the perforations, and engaging means to push the ports or fitments through the perforations of the film.

Thus, from the moment they are placed on the film, the ports or fitments are secured the film and they do not risk movement with respect to the perforations during the movements of the film toward the sealing station.

Preferably, the ports or fitment have a base and at least one tubular member that forms a single piece with the base, and the port or fitment is positioned by introducing the tubular member through the perforations of the film, so that the base is placed against the film on one side of the film and projects on one side of the film opposite the base. Thus, when the film is later shaped into a bag or pouch, the base is located inside the bag and is no longer subject to the tearing stresses during bag handlings.

In a preferred embodiment of the present invention, the means for transporting the ports or fitments, the positioning means, and the engaging means are located below the perforated film. In that way, the film is not subject to pollution, such as particles generated from the operation of the various mechanisms.

According to a preferred embodiment of the invention, the transporting means include an endless chain that extends in a direction transverse to the perforated film, a series of transporting forks mounted to overhang relative to the endless chain and driving means for the step by step displacement of the forks. Specifically, the driving means for the step by step displacement include a driving jack having a stem that supports a shoe facing one side of the transporting forks.

Preferably, the apparatus includes a fork detection means adjacent to the positioning means, and means for blocking the chain connected to the fork detection means. Specifically, the blocking means includes an electromagnet that is placed facing a blocking member made of magnetic material supported by a feed pinion of the endless chain. The blocking member is connected to the feed pinion by means of an elastic ring fixed in alternate points to the feed pinion and to the blocking member. Thus, for each reciprocating movement of the driving stem, the forks drive the ports or fitments in a step by step forward movement. The blocking means, associated with the detection means, makes possible a very precise positioning of the port or fitment.

According to another preferred embodiment of the invention, the positioning means includes a positioning jack located along an axis of the forks, a vertical positioning duct with a lateral opening facing the positioning jock, and an internal wall that corresponds in shape to the internal contour of the ports or fitments. Thus, the ports or fitments are positioned precisely perpendicularly to the perforation of the film as the ports or fitments are supported against the internal wall of the positioning duct.

According to a further preferred embodiment of the present invention, the engaging means includes an engaging jack located facing the positioning duct and having a stem that carries a pushing plate with a contour similar to the internal wall of the positioning duct. In this way, the ports or fitments are pushed through the perforations of the film being guided against the supporting surface.

Other features and advantages of the invention are described in and will be apparent from the following detailed description of the presently preferred embodiments invention and the attached drawings.

DESCRIPTION OF THE PRESENTLY PREFERRED EMBODIMENTS

Figure 1:
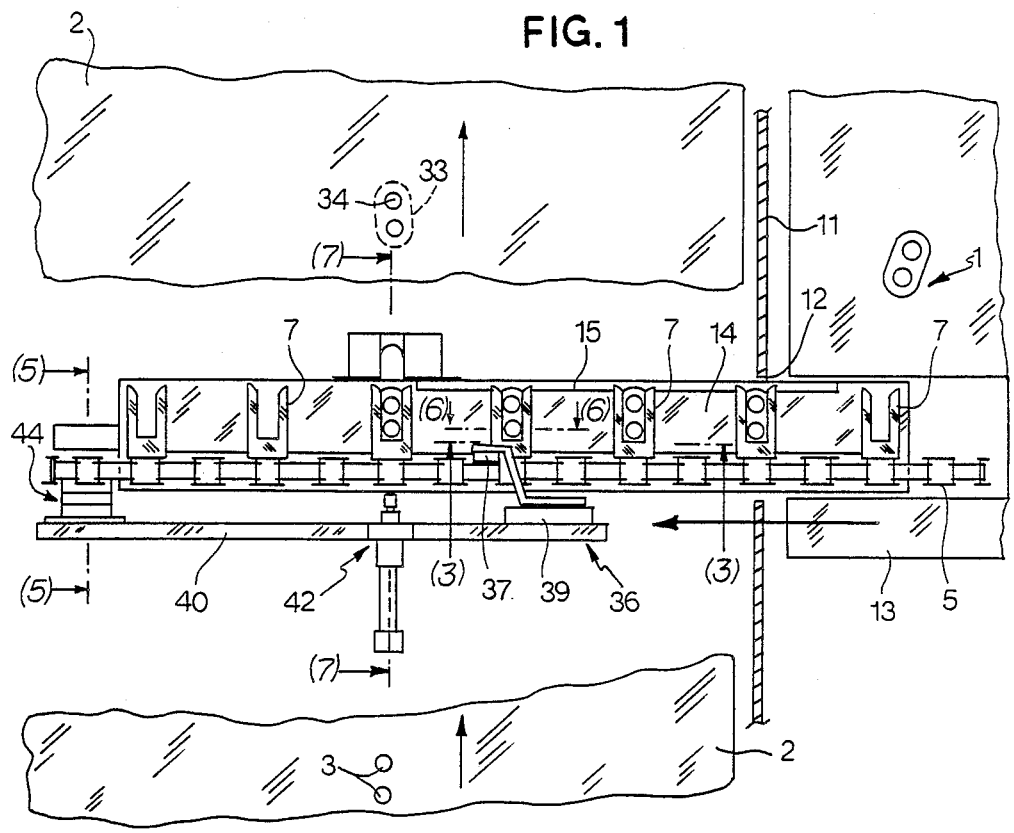
FIG. 1 is a top plan view of the present invention.
Figure 2:
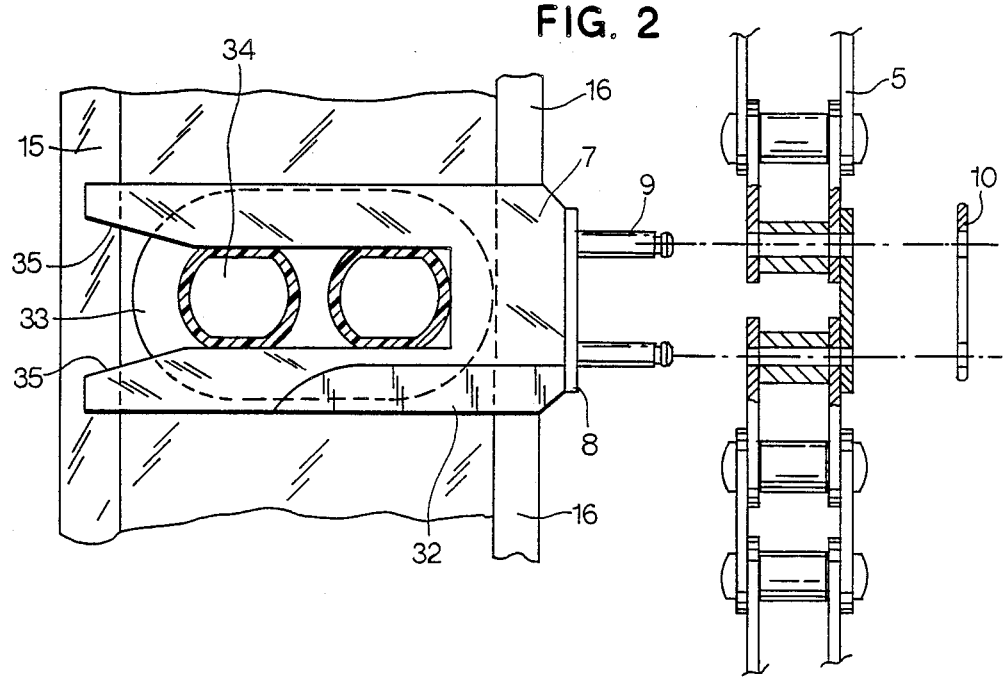
FIG. 2 is an enlarged, exploded top view, of a portion of the driving means.
Figure 3:
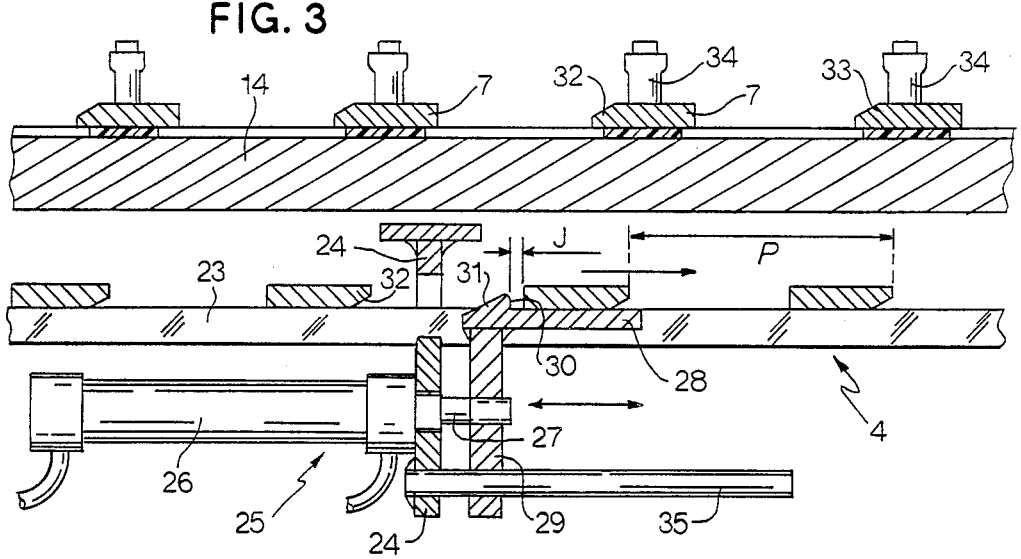
FIG. 3 is an enlarged, cross-sectional view taken along line III—III in FIG. 1.
Figure 4:
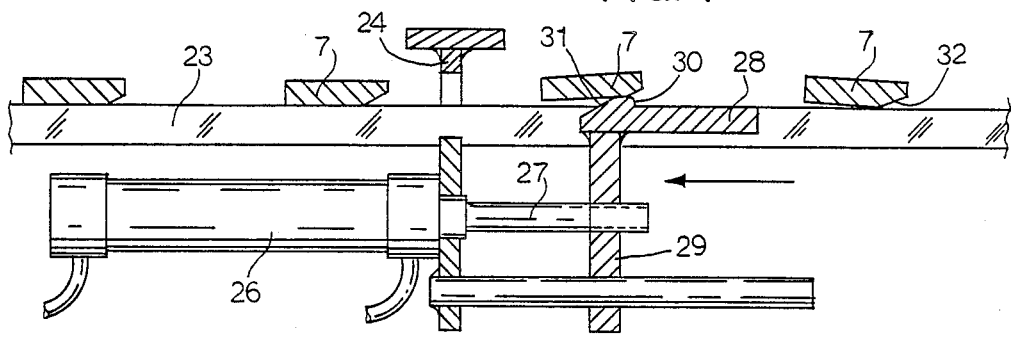
FIG. 4 is a view of FIG. 3 with the members in a different position.

Referring to the figures, a device is constructed in accordance with the principles of the present invention to properly position ports or fitments 1 on a flat film 2 that extends horizontally and has perforations 3. To this end, the ports or fitments 1 are first moved in juxtaposition to the film 2 by transporting means generally designated by numeral 4, which includes an endless chain 5 mounted so as to move over feed pinions 6 and that extends below film 2, in a direction transverse to the film. Transporting forks 7 are mounted overhanging on the endless chain 5. As illustrated in FIG. 2, each fork 7 is welded to a fast tie 8 having pins 9 substituted for the shafts of a link in the chain 5 and are held in place by a clip 10. In this way, the forks 7 do not hinder rotation of the chain 5 on the feed pinions 6.

Figure 7:
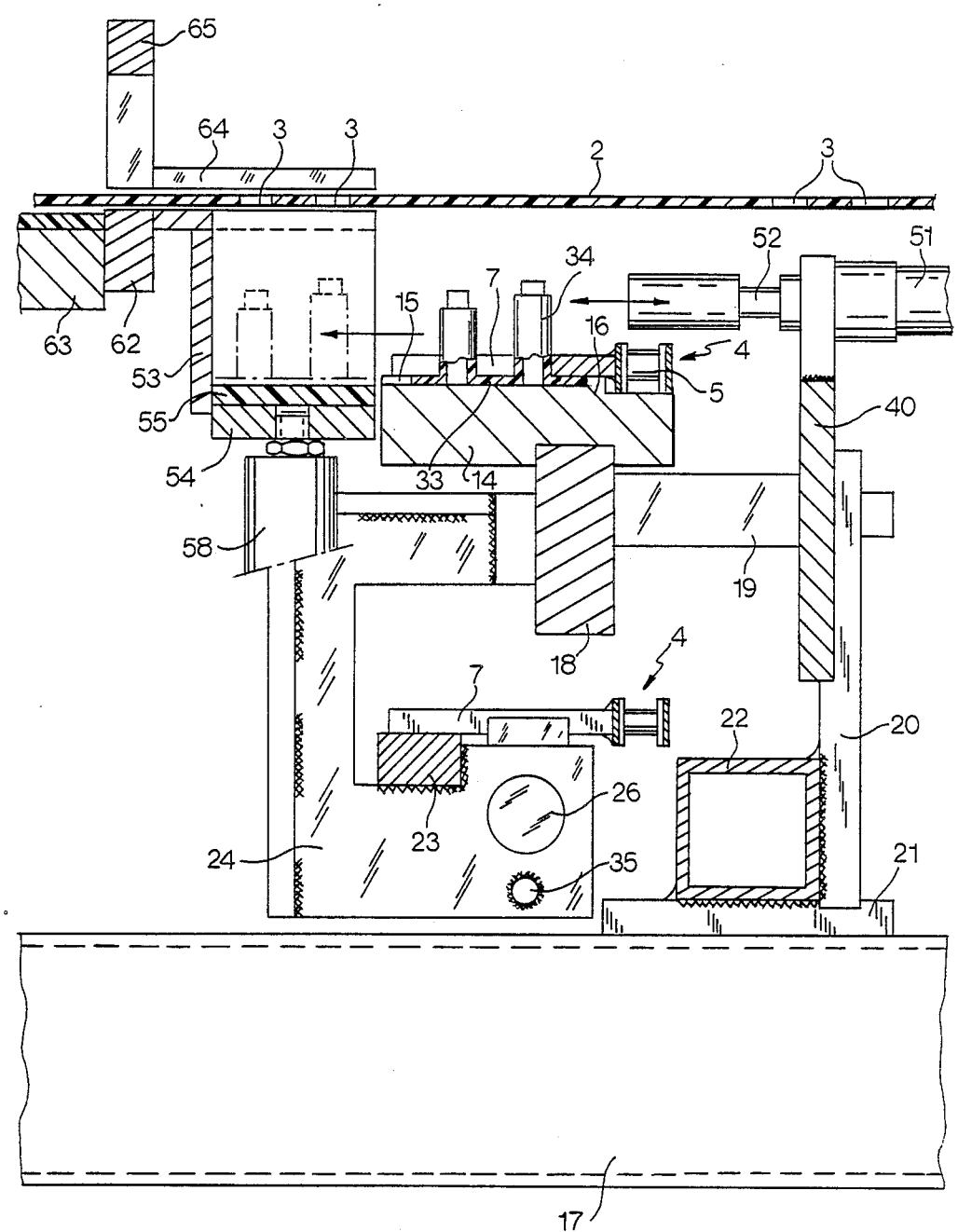
FIG. 7 is an enlarged cross-sectional view taken along line VII—VII in FIG. 1.

In the illustrated embodiment, the machine for the treatment of film 2 includes a lateral wall 11 that has an opening 12 through which the chain 5 and the associated forks 7 pass. At the feeding end of the chain 5, the transporting means are surrounded by a feeding table 13 on which the ports or fitments 1 are stored before they are mutually introduced between the arms of the forks 7. Below the forks 7, the transporting means include a guiding rail 14 with one edge supporting the upper side of the chain 5. Guiding rail 14 also has on its upper face projecting edges 15 and 16 which respectively support the tip of the fork arms 7 and the connection portion of the forks 7. The projecting edge 15 is broken near the feeding end and near the middle of the film 2 to permit the loading and unloading of the ports or fitments 1 on the forks 7 be described below in greater detail of the machine is explained. The guiding rail 14 is connected to chassis 17 of the machine, as illustrated in FIG. 7 by a series of small beams and cross pieces 18, 19, 20 and 21. The rigidity of which is reinforced by a small tubular beam 22 having a square cross-section.

The lower side of transporting means 4 is supported by a support rail 23 on which rests the end of the arms of forks 7. The support rail 23 may have a coating that facilitates their sliding (not shown). The support rail 23 is affixed to the chassis 17 by a console 24.

The forks 7 are moved by an intermittent driving means generally designated as numeral 25. These driving means include a double action driving jack 26, preferably a pneumatic jack, connected in a conventional manner to a source of fluid under pressure (not shown). The driving jack 26 is affixed to the console 24 and it has a stem 27 extending in a direction parallel to a support rail 23. The stem 27 supports at its free end a shoe 28 connected to the stem 27 by a plate 29. The shoe 28 extends via a shoulder 30, in a position facing one side of the transporting forks 7. The movement of the shoe 28 is guided by a guiding stem 35 fixed in the console 24, and it passes through an opening in the plate 29. On its rear side, with respect to the direction of movement of the lower side of the transporting means, the shoe 28 has a bevelled portion 31 which mates with a reversed bevelled portion 32 on the fore edge of the transporting forks 7.

The transporting means 4 functions in the following manner. At the feeding end adjacent to the feeding table 13, the ports or fitments 1 are positioned by engaging the base 33 of the ports or fitments 1 under the fork 7, as tubular members 34, of which there are two here, and which are formed as a single unit with the base 33, extend vertically upward between the arms of fork 7. It will be noted that the engaging of a port or fitment 1 is facilitated by play which exists under fork 7, as that fork rests on projecting edge 16. It is also facilitated by the bevels 35 provided on the arms of fork 7. In that position, the base 33 rests on the guiding rail 14. The jack 26 is then moved reciprocally. For each extension of the jack stem 27, the shoulder 30 of the shoe 28 is supported by one side of the fork 7 of the lower face and pushes the fork 7 one step forward. The port or fitment 1 which has just been introduced into the fork 7 then moves on the guiding rail 14 and is held in place in the fork 7 by the projecting edge 15. During a retraction movement of the jack stem 27, the bevelled portion 31 of the shoe 28 engages under the bevelled portion 32 of the fork 7 which is immediately adjacent and lifts the fork 7 because of the flexibility of the chain 5 as well as the slight torsion it can accept. It must be noted here that the stem of jack 26 must move a distance equal to the sum of the Step P between two forks and of play J which results from the flexibility of the chain 5. It is possible to maintain the J constant by periodic adjustments with a chain stretching element (not shown) known in the prior art. One embodiment of the present invention, however, offers a more precise means to determine the stopping location of the forward motion of the forks 7. According to the illustrated embodiment, these means include a fork detection means 36 associated with chain blocking means.

Figure 5:
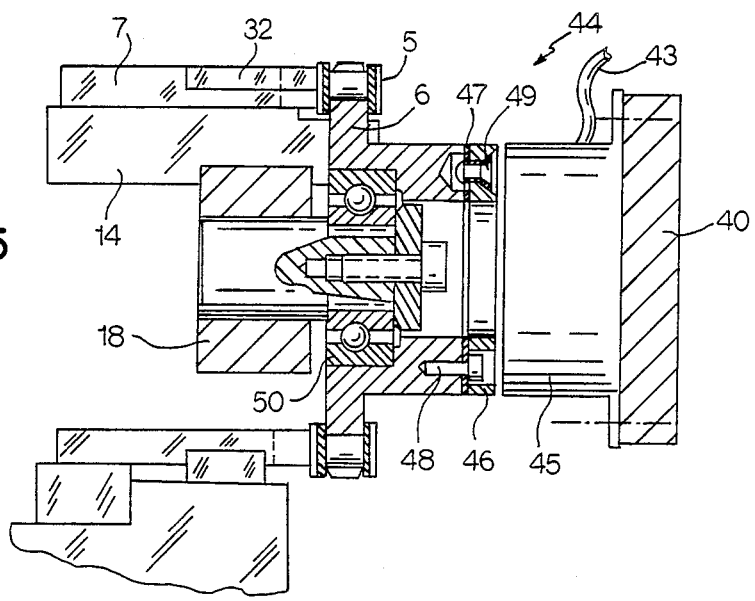
FIG. 5 is an enlarged cross-sectional view taken along line V—V in FIG. 1.
Figure 6:
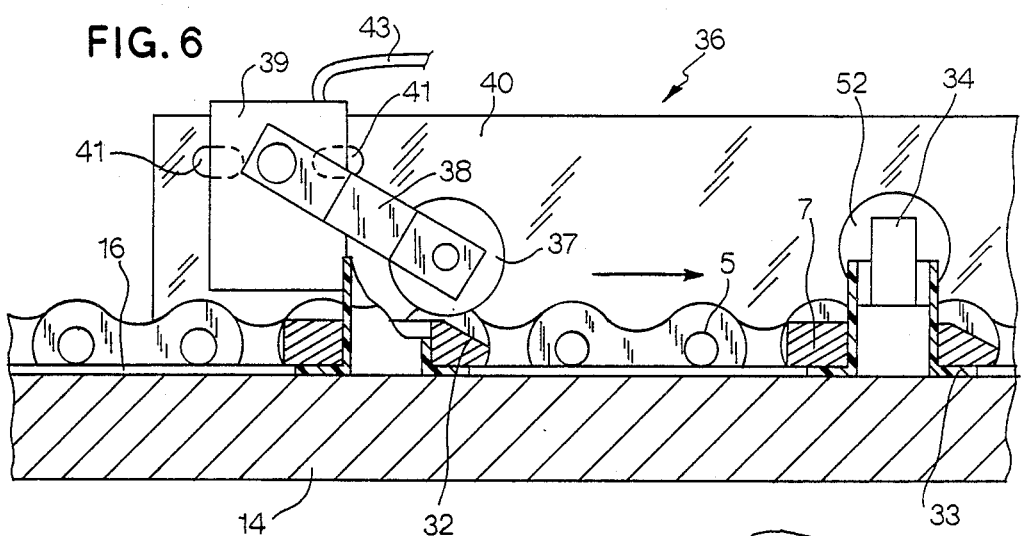
FIG. 6 is an enlarged cross-sectional view taken along line VI—VI in FIG. 1.

The fork detection means 36 are of a conventional type including a small wheel or roller 37 rotatably mounted at the end of an arm 38 which is itself pivotably mounted on the detection box 39. Detection box 39 contains a contact regulated by the movement of the arm 38. The detection box 39 is attached to a plate 40 which is attached to a plate 20 (FIG. 7) of the chassis 17. The precise position of the fork detection means 36 is adjusted in any conventional manner, for example, by means of bolts passing through elongated openings 41 in the plate 40. The detection means 36 are positioned adjacent to positioning means indicated generally as numeral 42, of which is discussed in more detail below. The detection box 39 is connected by a cable 43 to a chain blocking means 44 and illustrated in detail in FIG. 5.

The blocking means 44 includes an electromagnet 45 mounted on plate 40 in a position facing a ring-shaped the blocking member 46 made of magnetic material. Blocking member 46 is carried by the feed pinion 6 and it is connected to the latter by an elastic annular ring 47 attached in alternate points along its circumference to the feed pinion 6 by screws 48 and to the blocking member 46 by rivets 49. The feed pinion 6, moreover, is assembled in a conventional manner on a ball bearing 50 mounted on a small beam 18 that supports the guiding rail 14.

The detection means 36 are positioned so that when a fork 7 comes to face positioning means 42, the fork that immediately follows it lifts the small wheel or roller 37 and thereby activates the electromagnet 45, when actovated. Electromagnet 45 blocks the feed pinion 6 and consequently prevents the chain 5 from being moved by the action of the driving jack 26.

The positioning means 42 include a positioning jack 51, such as the double acting pneumatic jack mounted on plate 40 below film 2 as shown in FIG. 7. A stem 52 of the double acting jack 51 extends approximately parallel to the axes of forks 7, at a level approximately equal to that of the tubular members 34, the jack 51 is positioned so that in the retracted position of the jack stem 52 the end of the stem 52 is approximately perpendicular to the connection portions of the forks 7.

Facing the positioning jack 51 is a a vertical positioning duct 53 which has a lateral opening having the positioning jack 51 and an internal wall which partially fits the external contour of the base 33 of the ports or fitments 1. At its lower portion the positioning duct 53 has a pushing plate 54 coated with a sliding layer 55. The pushing plate 54 preferably has a contour which fits the internal wall of the positioning duct 53. When a port or fitment 1 is located in a position facing the positioning jack 51, the latter is set into motion with a reciprocal movement and the end of the stem 52 pushes against one of the tubular members 34 to release the port or fitment 1 from the fork 7 and push it into the positioning duct 53. The port or fitment 1 is guided by the lateral walls of the positioning duct 53 and stops against the internal wall. In that position, the tubular members 34 of the ports or fitments 1 are aligned with the perforations 3 in the film 2, and the ports or fitments 1 are below the film which has been advanced to the proper position by film advancing means (not shown).

Figure 8:
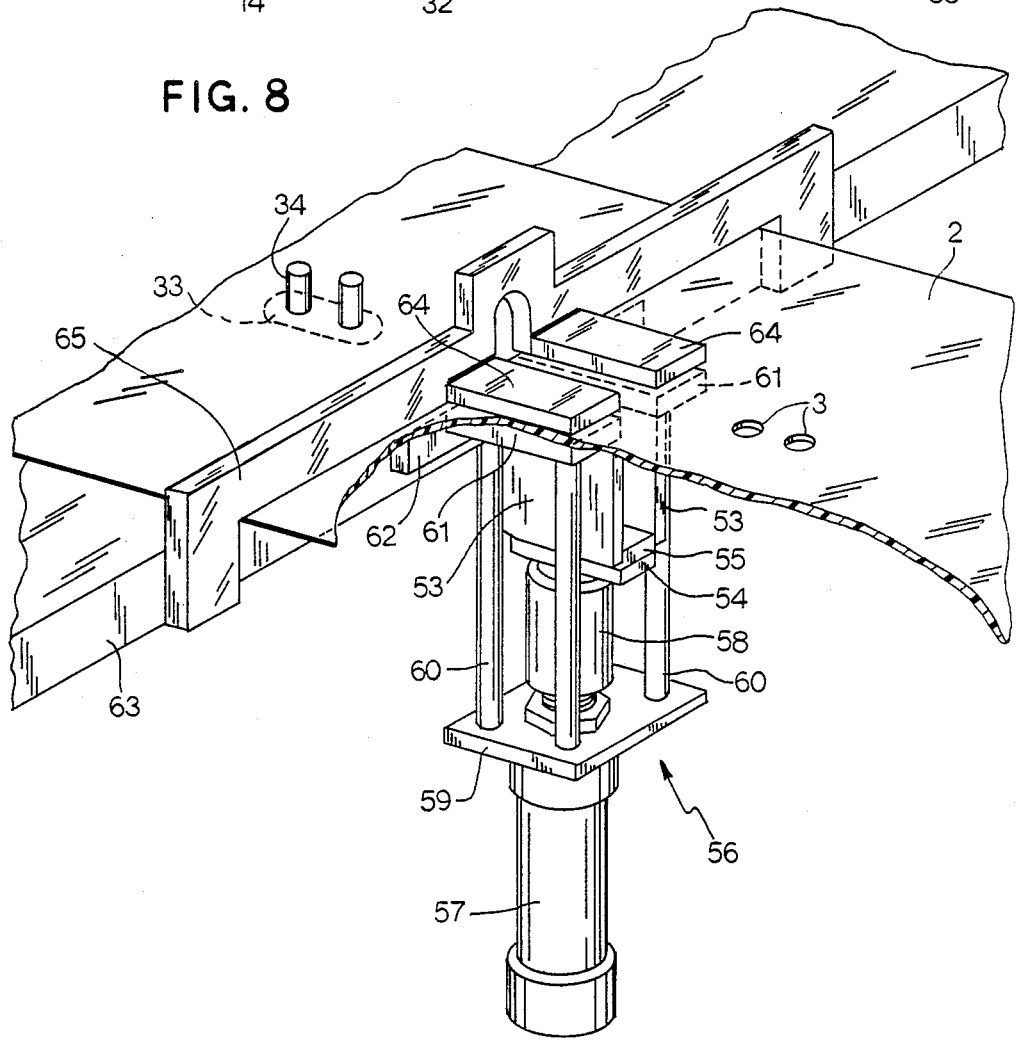
FIG. 8 is a perspective view of the invention.

Engaging means, generally designated by numeral 56, are positioned below the positioning duct 53. These engaging means 56 include an engaging jack 57 (FIG. 8) positioned below and facing the positioning duct 53. The engaging jack 57 has a stem 58 which carries a pushing plate 54. The engaging jack is carried by a plate 59 that is mounted at the lower part of columns 60 that surround the positioning duct 53. The columns 60 have their upper end attached flanges 61 of a console 62 affixed to the side of a plate 63 that is attached to the chassis of the machine.

When a port or fitment 1 is located in the positioning duct 53, the jack 57 moves with a reciprocal motion and the pushing plate 54 rises to move the tubular members 34 into perforations 3. Downstream from the port or fitment positioning device, consequently, base 33 is placed against the film, on one side of the film, and the tubular members 34 project on one side of the film 2 that is opposite the base 33. The apparatus preferably has sequential means which move the film 2 to a position above the plate 63 before the pushing plate 54 moves back down to a position to receive the next port or fitment. This prevents the port or fitment 1 from falling.

If the tubular members are not exactly positioned on the axis of the perforations 3, the film 2 may be raised off the plate 63 when the tubular members 34 are pushed through the perforations 3. To prevent this from occurring film-maintaining members are provided through the flanges or wings 64 placed above the film 2 on each side of the upper end of positioning duct 53. In the embodiment described and illustrated the flanges or wings 64 are attached on a strap 65 that serves as a film guide and which is attached to the side of the plate 63.

It should be understood that the invention is not limited to the embodiment which has been described therein and that modifications apparent to those skilled in the art can be made to it. Specifically, it is possible to provide a device for the automatic introduction of the ports or fitments 1 on the transporting forks 7.

It is also possible to replace the fixed driving shoe 28 by a retractable catch mounted on the stem of the driving jack 26.

We claim:

1. A device for positioning ports on a perforated film that includes transporting means to bring the ports close to the film, positioning means to position the ports perpendicular to the perforations, and engaging means to push the ports through the perforations of the film, generally positioned below the perforated film, the transporting means includes an endless chain which extends in a direction transverse to the direction of the perforated film, a series of transporting forks mounted overhanging with respect to the endless chain and means for the step by step driving of the forks, the step by step driving means include a driving jack which has a stem supporting a shoe positioned to face one side of the transporting forks, the shoe has a bevelled portion on a rear edge relative to a direction of movement of the chain and each transporting fork has a bevelled portion reversed relative to the bevelled portion of the shoe.

2. A device for positioning ports on a perforated film that includes transporting means to bring the ports close to the film, positioning means to position the ports perpendicular to the perforations, and engaging means to push the ports through the perforations of the film, generally positioned below the perforated film, the transporting means includes an endless chain which extends in a direction transverse to the direction of the perforated film, a series of transporting forks mounted overhanging with respect to the endless chain and means for the step by step driving of the forks, and including means for fork detection adjacent to the positioning means and a blocking means for the endless chain connected to the fork detection means.

3. A device according to claim 2, characterized in that the blocking means (44) include an electromagnet (45) positioned facing a blocking member (46) made of magnetic material, carried by a feed pinion (6) for the endless chain (5), the blocking member (46) being connected to the feed pinion (6) by an elastic ring (47) fixed in alternate points to the feed pinion (6) and to the blocking member (46).

4. A device for positioning ports on a perforated film that includes transporting means to bring the ports close to the film, positioning means to position the ports perpendicular to the perforations, and engaging means to push the ports through the perforations of the film, generally positioned below the perforated film, the transporting means includes an endless chain which extends in a direction transverse to the direction of the perforated film, a series of transporting forks mounted overhanging with respect to the endless chain and means for the step by step driving of the forks, the positioning means includes a positioning jack positioned along one axis of the forks and a positioning duct that is vertical and has a lateral opening facing the positioning jack and an internal wall which partially fits an internal contour of the ports.

5. A device according to claim 4, characterized in that the engaging means (56) include an engaging jack (57) placed facing the positioning duct (53) and having a stem (58) that carried a pushing plate (54) with a contour similar to that of the internal wall of the positioning duct (53).

6. A device for positioning fitments in a film having perforations comprising:
transportation means for moving the fitments into a vicinity of the film, the transportation means being positioned below the film, and including a chain loop having a plurality of transporting forks mounted on the chain loop;
positioning means for positioning a fitment perpendicular to a perforation, the positioning means being located below the film;
engaging means for pushing a fitment through a respective perforation, the engaging means being located below the film;
driving means for moving the forks intermittently, the driving means including a driving jack having a stem with a shoe, the shoe being positioned adjacent to one of the forks, the shoe moving the respective fork upon the driving jack moving in a first direction;

the shoe further including a bevelled portion on the trailing edge of the shoe, each fork also including a bevelled portion shaped and dimensioned to complement the bevelled portion of the shoe, whereupon when the driving jack moves in a second direction opposite to the first direction a fork slides over the top of the shoe.

7. A device for positioning fitments in a film having perforations comprising:
   transporting means for moving the fitments into a vicinity of the film, the transporting means being positioned below the film, and including a chain loop having a plurality of transporting forks mounted on the chain loop;
   positioning means for positioning a fitment perpendicular to a perforation, the positioning means being located below the film;
   engaging means for pushing a fitment through a respective perforation, the engaging means being located below the film;
   driving means for moving the forks intermittently, the driving means including a driving jack having a stem with a shoe, the shoe being positioned adjacent to one of the forks, the shoe moving the respective fork upon the driving jack moving in a first direction; and
   detecting means for detecting the presence of a fork in a predetermined location.

8. The device of claim 7 including blocking means for preventing the movement of the chain upon the detection of a fork in a certain predetermined location.

9. The device of claim 8 wherein the blocking means includes an electro-magnet and a blocking member constructed from a magnetic material, the electro-magnet being positioned adjacent to the blocking member, the blocking member being coupled to the chain loop by a resilient member.

10. The device of claim 9 wherein the resilient member includes an elastic ring that is coupled at alternate points to the blocking member and to the chain loop.

11. A device for positioning fitments in a film having perforations comprising:
    a chain loop having a plurality of forks mounted on the chain, the forks functioning to transport the fitments into a vicinity of the film;
    a positioning jack located adjacent a fitment to be positioned within the film;
    a positioning duct having a side opening facing the positioning jack, the positioning jack placing the fitment within the positioning duct perpendicular to a perforation of the film;
    engaging means for pushing a fitment through a respective perforation upon the fitment being positioned perpendicular to a perforation of the film;
    a driving jack having a stem with a shoe, upon the driving jack operating, the shoe intermittently advances the chain loop;
    detection means for detecting a fork in a predetermined location;
    a blocking member positioned adjacent the chain loop, the blocking member being formed of a magnetic material;
    a resilient member coupling the blocking member to the chain loop; and
    an electro-magnet being positioned adjacent the blocking member, upon the detection means detecting a fork in a predetermined location the electro-magnet acting with the blocking member to prevent the advancement of the chain loop.

12. The device of claim 11 wherein the positioning duct includes an internal wall having a shape that complements a portion of the shape of the fitment.

13. The device of claim 12 wherein the engaging means includes an engaging jack having a reciprocating rod that carries a pushing plate, the pushing plate having a contour, a portion of which is substantially similar to the shape of the positioning duct internal wall.

* * * * *